United States Patent [19]

Wagner et al.

[11] 4,303,771
[45] Dec. 1, 1981

[54] PROCESS FOR THE PREPARATION OF HIGH DENSITY ETHYLENE POLYMERS IN FLUID BED REACTOR

[75] Inventors: Burkhard E. Wagner, Highland Park; George L. Goeke; Frederick J. Karol, both of Belle Mead, all of N.J.

[73] Assignee: Union Carbide Corporation, New York, N.Y.

[21] Appl. No.: 12,712

[22] Filed: Feb. 16, 1979

Related U.S. Application Data

[63] Continuation-in-part of Ser. No. 969,275, Dec. 14, 1978, abandoned.

[51] Int. Cl.³ .................................................. C08F 4/52
[52] U.S. Cl. .................................... 526/125; 526/129; 526/352
[58] Field of Search ............ 526/124, 125, 348, 348.2, 526/348.3, 348.4, 348.5, 348.6, 348.7

[56] References Cited

U.S. PATENT DOCUMENTS

| | | | |
|---|---|---|---|
| 2,839,515 | 6/1958 | Davison | 526/348 |
| 3,642,746 | 2/1972 | Kashiwa | 526/125 |
| 3,645,992 | 2/1972 | Elston | 526/348.2 |
| 3,888,835 | 6/1975 | Ito | 526/125 |
| 3,920,621 | 11/1975 | Baxmann | 526/348.7 |
| 4,035,560 | 7/1977 | Caumartin | 526/124 |
| 4,107,413 | 8/1978 | Giannini | 526/124 |
| 4,107,414 | 8/1978 | Giannini | 526/124 |
| 4,107,415 | 8/1978 | Giannini | 526/124 |
| 4,143,223 | 3/1979 | Toyota | 526/124 |

FOREIGN PATENT DOCUMENTS 1502567  3/1978  United Kingdom .

*Primary Examiner*—Paul R. Michl
*Attorney, Agent, or Firm*—John S. Piscitello

[57] ABSTRACT

A catalytic process for preparing ethylene polymers having a density of $\geq 0.94$ to $\leq 0.97$ and a melt flow ratio of about $\geq 22$ to $\leq 32$ in a low pressure gas phase process at a productivity of $\geq 50,000$ pounds of polymer per pound of Ti with a catalyst formed from selected organoaluminum compounds and a precursor composition of the formula $$Mg_m Ti_1(OR)_n X_p (ED)_q$$

wherein ED is a selected electron donor compound
m is $\geq 0.5$ to $\leq 56$
n is 0, 1 or 2
p is $\geq 2$ to $\leq 116$
q is $> 1.5 \, m + 2$
R is a $C_1$ to $C_{14}$ aliphatic or aromatic hydrocarbon radical, or COR' wherein R' is a $C_1$ to $C_{14}$ aliphatic or aromatic hydrocarbon radical, and
X is selected from the group consisting of Cl, Br, I or mixtures thereof,
which catalyst is in particulate form and impregnated in a porous inert carrier material.

9 Claims, 1 Drawing Figure

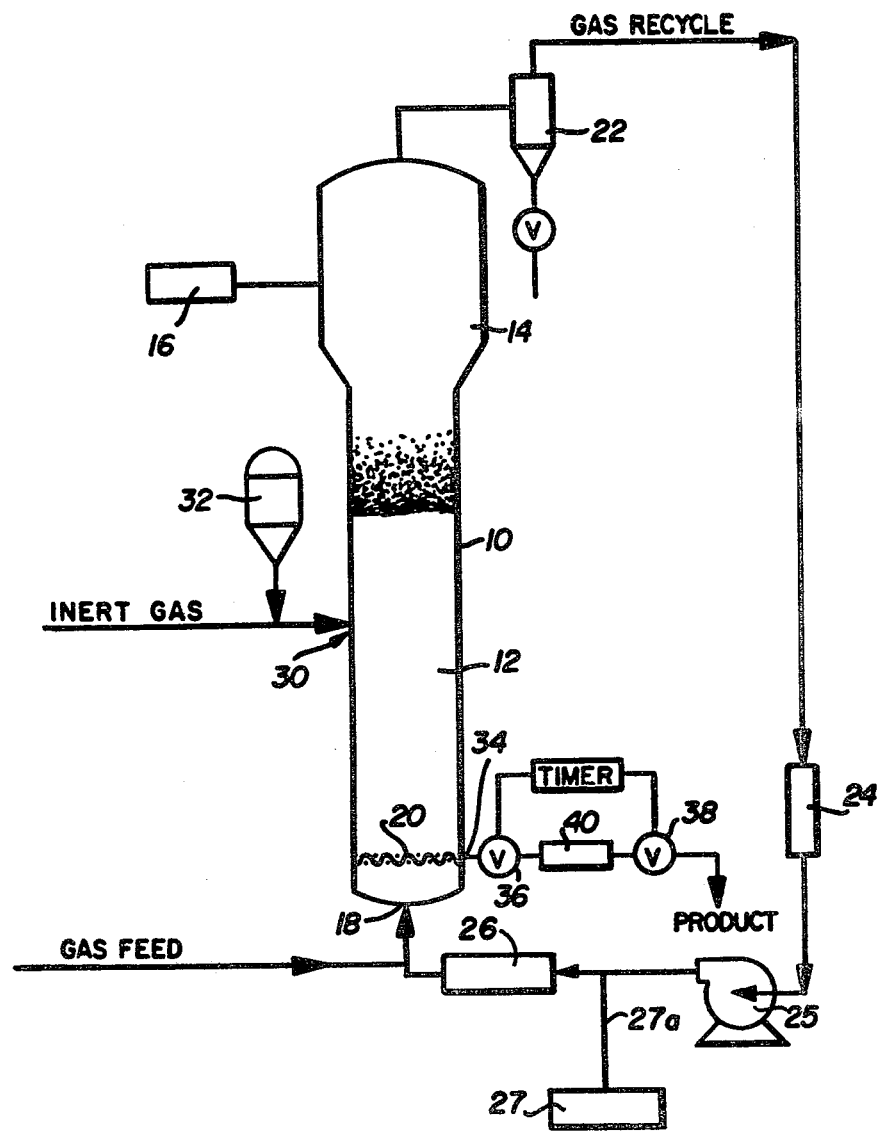

PROCESS FOR THE PREPARATION OF HIGH DENSITY ETHYLENE POLYMERS IN FLUID BED REACTOR

This application is a Continuation-In-Part of copending application Ser. No. 969,275 filed Dec. 14, 1978, now abandoned.

BACKGROUND OF THE INVENTION

The invention relates to the catalytic homopolymerization and copolymerization of ethylene with high activity Mg and Ti containing complex catalysts in a low pressure gas phase process to produce polymers having a density of about $\geq 0.94$ to $\leq 0.97$, a melt flow ratio of about $\geq 22$ to $\leq 32$ and having a relatively round particle shape and a relatively low level of fines.

DESCRIPTION OF THE PRIOR ART

Ethylene homopolymers having a density of $\geq 0.96$ and a melt index in the range of about 5 to 50 are useful for injection molding purposes requiring excellent impact strength properties provided that they have a relatively narrow molecular weight distribution. Ethylene polymers having a density of $\geq 0.96$ and a melt index of $\leq 20$ can be made with the catalysts and low pressure gas phase processes described in U.S. Pat. Nos. 3,023,203; 4,003,712 and 3,709,853. The polymers made with the supported chromium oxide, silylchromate and chromocene catalysts, however, have a relatively broad molecular weight distribution as evidenced by melt flow ratio values of $\geq 35$. The polymers of these patents, therefore, have relatively limited use for injection molding applications requiring excellent impact strength properties. It is desirable therefore, to provide catalysts which would enable one to readily prepare, in a gas phase process, ethylene polymers which have a relatively narrow molecular weight distribution.

To be commercially useful in a gas phase process, such as the fluid bed process of U.S. Pat. Nos. 3,709,853; 4,003,712 and 4,011,382, and Canadian Pat. No. 991,798 and Belgian Pat. No. 839,380, the catalyst employed must be a high activity catalyst, that is, it must have a level of productivity of $\geq 50,000$, preferably $\geq 100,000$, pounds of polymer per pound of primary metal in the catalyst. This is so because such gas phase processes usually do not employ any catalyst residue removing procedures. Thus, the catalyst residue in the polymer must be so small that it can be left in the polymer without causing any undue problems in the hands of the resin fabricator and/or ultimate consumer. Low catalyst residue contents are also important where the catalyst is made with chlorine containing materials such as the titanium, magnesium and/or aluminum chlorides used in some so-called Ziegler or Ziegler-Natta catalysts. High residual chlorine values in a molding resin will cause pitting and corrosion on the metal surfaces of the molding devices. Cl residues of the order of $\geq 200$ ppm are not commercially useful.

U.S. Pat. No. 3,989,881 discloses the use of a high activity catalyst for the manufacture, under slurry polymerization conditions, of ethylene polymers having a relatively narrow molecular weight distribution (Mw/Mn) of about 2.7 to 3.1. Attempts were made to use catalysts similar to those described in U.S. Pat. No. 3,989,881 for the purpose of making polyethylene of narrow molecular weight distribution by polymerizing ethylene alone or with propylene in the gas phase in a fluid bed process using apparatus and conditions similar to those employed in U.S. Pat. No. 4,011,382 and Belgian Pat. No. 839,380. These attempts were not successful. In order to avoid the use of the solvents in the slurried catalyst systems of U.S. Pat. No. 3,989,881, the Ti/Mg containing components were dried. However, the dried material, a viscous, gummy, pyrophoric composition, could not be readily fed to the reactor because it was not in a free flowing form. Even when blended with silica to improve its free-flowing properties and then added to the reactor the results were commercially unacceptable. The productivity of the catalyst was poor, or the catalyst was pyrophoric and difficult to handle and the polymer product was produced in the form of needle-shaped products which were difficult to fluidize and which exhibited very poor flow properties.

U.S. Pat. Nos. 3,922,322 and 4,035,560 disclose the use of several Ti and Mg containing catalysts for the manufacture of granular ethylene polymers in a gas phase fluid bed process under a pressure $\leq 1000$ psi. The use of these catalysts in these processes, however, has significant disadvantages. The catalysts of U.S. Pat. No. 3,922,322 provide polymers having a very high catalyst residue content, i.e., about 100 ppm of Ti and greater than about 300 ppm Cl, according to the working example of this patent. Further, as disclosed in the working example of U.S. Pat. No. 3,922,322, the catalyst is used in the form of a prepolymer, and very high volumes of the catalyst composition must be fed to the reactor relative to the volume of polymer made in the reactor. The preparation and use of this catalyst thus requires the use of relatively large sized equipment for the manufacture, storage and transporting of the catalyst.

The catalysts of U.S. Pat. No. 4,035,560 also apparently provide polymers having high catalyst residues, and the catalysts compositions are apparently pyrophoric because of the types and amounts of reducing agents employed in such catalysts.

U.S. Pat. No. 4,124,532 discloses the polymerization of ethylene and propylene with high activity catalysts. These catalysts comprise complexes which may contain magnesium and titanium. These complexes are prepared by reacting the halide $MX_2$ (where M may be Mg) with a compound M'Y (where M' may be Ti and Y is halogen or an organic radical) in an electron donor compound. These complexes are then isolated by either crystallization, by evaporation of the solvent or by precipitation. Polymerization is carried out with these catalytic complexes and an alkyl aluminum compound.

However, U.S. Pat. No. 4,124,532 does not disclose any special techniques or methods of preparing the catalyst in order to achieve the desirable results described in the present invention. The use of the catalysts described in U.S. Pat. No. 4,124,532, without these special methods, would not lead to a commercial fluid bed process to produce polyethylenes at commercial rates. In addition the examples in the gas phase do not describe a practical process of copolymerization to produce copolymers with attractive polymer morphology described in the present invention.

U.S. Patent Application Ser. No. 892,322 filed on Mar. 31, 1978, and refiled as Application Ser. No. 012,720 on Feb. 16, 1979 in the names of G. L. Goeke et al. and entitled Impregnated Polymerization Catalyst, Process For Preparing, and Use for Ethylene Copolymerization discloses that ethylene copolymers, having a density of about $\geq 0.91$ to $\leq 0.94$ and a melt flow ratio of $\geq 22$ to $\leq 32$ and which have a relatively low residual catalyst content and a relatively high bulk density and which provide films of good clarity can be produced at relatively high productivities for commercial purposes by a gas phase process if the ethylene is copolymerized with one or more $C_3$ to $C_6$ alpha olefins in the presence of a high activity magnesium-titanium containing complex catalyst prepared under specific activation conditions with an organoaluminum compound and impregnated in a porous inert carrier material.

In the catalyst activation procedure the activation is conducted in at least two stages. In the first stage the precursor composition, impregnated in the silica, is reacted with, and partially activated by, enough activator compound so as to provide a partially activated precursor composition which has an activator compound/Ti molar ratio of about $>0$ to $<10:1$ and preferably of about 4 to 8:1. In order to render the partially activated and impregnated precursor composition active for ethylene polymerization purposes, additional activator compound must also be added to the polymerization reactor to complete, in the reactor, the activation of the precursor composition. The additional activator compound and the partially activated impregnated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound.

When the impregnated catalyst of Application Ser. No. 892,322 and 012,720 was evaluated for the preparation of high density ($\geq 0.94$) products at elevated temperatures it was found that the performance of these catalysts was highly dependent on the amount of electron donor $[ED]_q$ in the impregnated precursor composition. Investigations have shown that the level of electron donor in the impregnated precursor can be controlled to some extent by the drying process but is is difficult to control this drying in such a way as to prepare reproducible precursor with precisely the desired level of electron donor.

U.S. Patent Application Ser. No. 892,037 filed on Mar. 31, 1978, and refiled as Application Ser. No. 014,412 on Feb. 27, 1979 in the names of B. E. Wagner et al. and entitled Polymerization Catalyst, Process for Preparing And, Use For Ethylene Homopolymerization, discloses that ethylene homopolymers having a density range of 0.96 to 0.97 and a melt flow ratio of $\geq 22$ to $\leq 32$ and which have a relatively low residual catalyst residue can be produced at relatively high productivities for commercial purposes by a low pressure gas phase process if the ethylene is homopolymerized in the presence of a high activity magnesium-titanium complex catalyst blended with an inert carrier material. Although these catalysts have high activity, the polymers produced with this blended catalyst have the disadvantage that the polymer particles formed during the fluid bed polymerization process are irregular in shape and are somewhat difficult to fluidize. Also, the final product contains a relatively high level of fines, i.e., particles having a particle size of $\leq 125$ microns.

SUMMARY OF THE INVENTION

It has now been unexpectedly found that ethylene homopolymers and copolymers having a density range of about $\geq 0.94$ to $\leq 0.97$ and a melt flow ratio of about $\geq 22$ to $\leq 32$ can be produced at relatively high productivities at a relatively high bulk density, with relatively low level of fines and with a relatively round particle shape. These polymers can be produced commercially by a low pressure gas phase process if the ethylene is homopolymerized or copolymerized in the presence of a high activity magnesium-titanium complex catalyst, and impregnated in selected amounts in a porous inert carrier material and activated under specific conditions, as is described below.

An object of the present invention is to provide a process for producing, with relatively high productivities and in a low pressure gas phase process, ethylene homopolymers and copolymers which have a density of about $\geq 0.94$ to $\leq 0.97$, a melt flow ratio of about $\geq 22$ to $\leq 32$, a relatively low residual catalyst content and a bulk density of about 21 to 32 pounds per cubic foot.

Another object of the present invention is to provide granular ethylene polymers which have a particle shape which is round and wherein the final polymer product contains a relatively low level of fines (particles $\leq 125$ microns).

BRIEF DESCRIPTION OF THE DRAWING

The drawing shows a gas phase fluid bed reactor system in which the catalyst system of the present invention may be employed.

DESCRIPTION OF THE PREFERRED EMBODIMENT

It has now been found that the desired ethylene homopolymers and copolymers having a density of about $\geq 0.94$ to $\leq 0.97$, a low melt flow ratio and relatively high bulk density values can be readily produced with relatively high productivities in a low pressure gas phase fluid bed reaction process if the monomer charge is polymerized under a specific set of operating conditions, as detailed below, and in the presence of a specific high activity catalyst, which is impregnated in an inert porous carrier material in order to achieve high activity and improved polymer particle morphology (including a relatively low level of fines) in producing ethylene polymers. The impregnated precursor where q is $>(1.5 m+2)$ (see below) is partially activated with $>0$ to $\leq 10$ mols of activator compound per mol of titanium in said precursor composition, and total activation of said partially activated precursor composition is completed in the reactor with $>10$ to $\leq 400$ mols of activator compound per mol of titanium in said composition. This activation procedure provides for a high activity catalyst and at the same time improves polymer particle morphology of the resulting ethylene polymers.

THE ETHYLENE POLYMERS

The ethylene polymers have a melt flow ratio of about $\geq 22$ to $\leq 32$, and preferably of $\geq 25$ to $\leq 30$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1 and the MFR range of $\geq 25$ to $\leq 30$ corresponds to a Mw/Mn range of about 2.8 to 3.6.

The copolymers which may be prepared in the process of the present invention are copolymers of a major mol percent ($\geq 97\%$) of ethylene, and a minor mol percent ($\leq 3\%$) of one (copolymer) or more (ter-,tetrapolymers) $C_3$ to $C_8$ alpha olefins. The $C_3$ to $C_8$ alpha olefins should not contain any branching on any of their carbon atoms which is closer than the fourth carbon atom. These alpha olefins include propylene, butene-1, pentene-1, hexene-1, 4-methylpentene-1, heptene-1 and octene-1. The preferred alpha olefins are propylene, butene-1, hexene-1, 4-methylpentene and octene-1.

The ethylene polymers have a density of about $\geq 0.94$ to $\leq 0.97$. The density of the copolymer, at a given melt index level of the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from comonomer to comonomer, under the same conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a homopolymer or a copolymer is a reflection of its molecular weight. Polymers having a relatively high molecular weight, have a relatively low melt index. Ultra-high molecular weight ethylene polymers have a high load (HLMI) melt index of about 0.0 and very high molecular weight ethylene polymers have a high load melt index (HLMI) of about 0.0 to about 1.0. Such high molecular weight polymers are difficult, if not impossible, to mold in conventional injection molding equipment. The polymers made in the process of the present invention, on the other hand, can be readily molded, in such equipment. They have a standard or normal load melt index of $\geq 0.0$ to about 100, and preferably of about 0.5 to 80, and a high load melt index (HLMI) of about 11 to about 2000. The melt index of the polymers which are made in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio. In addition to hydrogen other chain transfer agents such as dialkyl zinc compounds may also be used to further increase the melt index of the polymers.

The polymers of the present invention have an unsaturated group content of $\geq 1$, and usually $\leq 0.1$ to $\leq 0.3$, C=C/1000 carbon atoms, and a cyclohexane extractables content of less than about 3, and preferably less than about 2, weight percent.

The polymers of the present invention have a residual catalyst content, in terms of parts per million of titanium metal, of less than 20 parts per million, (ppm) at a productivity level of $\geq 50,000$. In terms of Cl, Br or I residues, the polymers of the present invention typically have a residue content of less than about 140 ppm at a productivity of $\geq 50,000$.

The polymers of the present invention are granular materials which have an average particle size of the order of about 0.02 to about 0.05 inches, and preferably of about 0.02 to about 0.04 inches, in diameter. The particle size is important for the purpose of readily fluidizing the polymer particles in the fluid bed reactor, as described below. These granular materials also have a low level of fines ($\leq 4.0$ percent of the total polymer product) and these fines are $\leq 125$ microns. Also, these granular materials exhibit a much more spherical shape (as observed by optical microscopy) than the granular materials described in Patent Application Ser. Nos. 892,037 and 014,412 supra.

The polymers of the present invention have a bulk density of about 21 to 32 pounds per cubic foot.

HIGH ACTIVITY CATALYST

The compounds used to form the high activity catalyst used in the present invention comprise at least one titanium compound, at least one magnesium compound, at least one electron donor compound, at least one activator compound and at least one inert carrier material, as defined below.

The titanium compound has the structure $$Ti(OR)_a X_b$$

wherein R is a $C_1$ to $C_{14}$ aliphatic or aromatic hydrocarbon radical, or COR' where R' is a $C_1$ to $C_{14}$ aliphatic or aromatic hydrocarbon radical.

X is selected from the group consisting of Cl, Br, I, or mixtures thereof, a is 0, 1 or 2, b is 1 to 4 inclusive and $a+b=3$ or 4.

The titanium compounds can be used individually or in combinations thereof, and would include $TiCl_3$, $TiCl_4$, $Ti(OC_6H_5)Cl_3$, $Ti(OCOCH_3)Cl_3$ and $Ti(OCOC_6H_5)Cl_3$.

The magnesium compound has the structure $$MgX_2$$

wherein X is selected from the group consisting of Cl, Br, I, or mixtures thereof. Such magnesium compounds can be used individually or in combination thereof and would include $MgCl_2$, $MgBr_2$ and $MgI_2$. Anydrous $MgCl_2$ is the particularly preferred magnesium compound.

About 0.5 to 56, and preferably about 1 to 10 moles of the magnesium compound are used per mol of the titanium compound in preparing the catalyst employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known, as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones. The most preferred of these electron donor compounds would include methyl formate, ethyl acetate, butyl acetate, ethyl ether, hexyl ether, tetrahydrofuran, dioxane, acetone and methyl isobutyl ketone.

The electron donors can be used individually or in combinatiions thereof.

The level of the electron donor [ED]q in the impregnated precursor composition of the present invention has a value of q is >1.5 m+2 and therefore requires partial activation as a critical step in the formation of a highly active catalyst which produces polymers with attractive particle morphology.

The activator compound has the structure $$Al(R'')_c X'_d H_e$$

where X' is Cl or OR''', R'' and R''' are the same or different and are $C_1$ to $C_{14}$ saturated hydrocarbon radicals, d is 0 to 1.5, e is 1 or 0 and c+d+e=3.

Such activator compounds can be used individually or in combinations thereof and would include $Al(C_2H_5)_3$, $Al(C_2H_5)Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(c_2H_5)_2(OC_2H_5)$.

About 10 to 400, and preferably about 15 to 60 mols of the activator compound are used per mol of the titanium compound in activating the catalyst employed in the present invention.

The carrier materials are solid, particulate porous materials which are inert to the other components of the catalyst composition, and to the other active components of the reaction system. These carrier materials would include inorganic materials such as oxides of silicon and/or aluminum. The carrier materials are used in the form of dry powders having an average particle size of about 10 to 250, and preferably of about 50 to 150 microns. These materials are also porous and have a surface area of ≧3, and preferably of ≧50, square meters per gram. Catalyst activity or productivity is apparently also improved with silica having pore sizes of ≧80 Angstrom units and preferably of ≧100 Angstrom units. The carrier material should be dry, that is, free of absorbed water. Drying of the carrier material is carried out by heating it at a temperature of ≧600° C. Alternatively, the carrier material dried at a temperature of ≧200° C. may be treated with about 1 to 8 weight percent of one or more of the aluminum alkyl compounds described above. This modification of the support by the aluminum alkyl compounds provides the catalyst composition with increased activity and also improves polymer particle morphology of the resulting ethylene polymers.

CATALYST PREPARATION: FORMATION OF PRECURSOR

The catalyst in the present invention is prepared by first preparing a precursor composition from the titanium compound, the magnesium compound, and the electron donor compound, as described below, and then impregnating the carrier material with the precursor composition.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and in some instances by refluxing these two compounds in the electron donor compound. After the titanium compound and the magnesium compound are dissolved, the precursor composition may be isolated by crystallization or by precipitation with a $C_5$ to $C_8$ aliphatic or aromatic hydrocarbon such as hexane, isopentane or benzene.

The crystallized or precipitated precursor composition may be isolated, in the form of fine, free flowing particles having an average particle size of about 10 to 100 microns and a settled bulk density of about 18 to 33 pounds per cubic foot.

CATALYST PREPARATION: IMPREGNATION OF PRECURSOR IN THE SUPPORT

The precursor composition is then impregnated, in a weight ratio of about 0.033 to 1, and preferably about 0.1 to 0.43, parts of the precursor composition into one part by weight of the carrier material.

The impregnation of the dried (activated) support with the precursor composition may be accomplished by dissolving the precursor composition in the electron donor compound, and by then admixing the support with the dissolved precursor composition so as to allow the precursor composition to impregnate the support. The solvent is then removed by drying at temperatures of ≦70° C.

The support may also be impregnated with the precursor composition by adding the support to a solution of the chemical raw materials used to form the precursor composition in the electron donor compound, without isolating the precursor composition from said solution. This represents the preferred method because of its simplicity. Most of the excess electron donor compound is then removed by drying at temperature of ≦70° C.

Experience has shown that drying of the impregnated precursor frequently leads to concentrations of the electron donor [ED]q, (see below), such that q is >1.5 m+2. It is expeditious in routine production of impregnated precursor to permit some excess (q is >1.5 m+2) electron donor to remain in the impregnated composition rather than risk overdrying and hence thermal decomposition of the precursor.

When thus made as disclosed above the precursor composition so impregnated has a formula $$Mg_m ti_1 (OR)_n X_p [ED]_q$$

wherein ED is the electron donor compound,
m is ≧0.5 to ≦56, and preferably ≧1.5 to ≦5,
n is 0, 1 or 2,
p is ≧2 to ≦116, and preferably ≧6 to ≦14,
q is <1.5 m+2
R is a $C_1$ to $C_{14}$ aliphatic or aromatic hydrocarbon radical, or COR' wherein R' is a $C_1$ to $C_{14}$ aliphatic or aromatic hydrocarbon radical and,
X is selected from the group consisting of Cl, Br, I, or mixtures thereof.

The subscript for the element titanium (Ti) is the arabic numeral one.

ACTIVATION OF PRECURSOR COMPOSITION

In order to be used in the process of the present invention the precursor composition must be fully or completely activated, that is, it must be treated with sufficient activator compound to transform the Ti atoms in the precursor composition to an active state.

In the catalyst activation procedure of the present invention the activation is conducted in two stages. In the first stage the precursor composition, impregnated in the silica, is reacted with, and partially activated by, enough activator compound so as to provide a partially activated precursor composition which has an activator compound/Ti molar ratio of about $>0$ to $<10:1$. This partial activation reaction is preferably carried out in a hydrocarbon solvent slurry followed by drying of the resulting mixture, to remove the solvent, at temperatures between 20 to 70, and preferably of 50° to 70° C. The resulting product is a free-flowing solid particulate material which can be readily fed to the polymerization reactor. The partially activated, impregnated precursor composition, however, is at best, weakly active, as a copolymerization catalyst in the process of the present invention. In order to render the partially activated, impregnated precursor composition active for ethylene polymerization purposes, additional activator compound must also be added to the polymerization reactor to complete, in the reactor, the activation of the precursor composition. The additional activator compound and the partially activated impregnated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The additional activator compound is added to the reactor in such amounts as to provide, in the reactor, with the amounts of activator compound and titanium compound fed with the partially activated and impregnated precursor composition, a total Al/Ti molar ratio of $\geq 10$ to 400 and preferably of about 15 to 60. The additional amounts of activator compound added to the reactor, react with, and complete the activation of, the titanium compound in the reactor.

In a continuous gas phase process, such as the fluid bed process disclosed below, discrete portions of the partially activated precursor composition impregnated on the support are continuously fed to the reactor, with discrete portions of any additional activator compound needed to complete the activation of the partially activated precursor composition, during the continuing polymerization process in order to replace active catalyst sites that are expended during the course of the reaction.

THE POLYMERIZATION REACTION

The polymerization reaction is conducted by contacting a stream of the monomer(s), in a gas phase process, such as in the fluid bed process described below, and substantially in the absence of catalyst poisons such as moisture, oxygen, carbon monoxide, carbon dioxide and acetylene, with a catalytically effective amount of the completely activated precursor composition (the catalyst) impregnated on a support at a temperature and at a pressure sufficient to initiate the polymerization reaction.

A fluidized bed reaction system which can be used in the practice of the process of the present invention is illustrated in FIG. 1. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 110-111 (1966).

It is essential that the bed always contain particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially activated impregnated precursor composition used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. the ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the gas recycle system at the hottest portion thereof. Addition into the recycle line, therefore, downstream from the heat exchanger is preferred, as from dispenser 27 thru line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 50, and preferably about 20 to 30 moles of the Zn compound (as Zn) would be used in the gas stream in the reactor per mol of titanium compound (as Ti) in the reactor. The zinc compound would be introduced into the reactor preferably in the form of a dilute solution (2 to 10 weight percent) in a hydrocarbon solvent or absorbed on a solid diluent material, such as silica, in amounts of about 10 to 50 weight percent. These compositions tend to be pyrophoric. The zinc compound may be added into the recycle gas stream from a feeder adjacent to feeder 27.

It is essential to operate the fluid bed reactor at a temperature below the sintering temperature of the polymer particles. To insure that sintering will not occur, operating temperatures below the sintering temperature are desired. For the production of ethylene polymers in the process of the present invention an operating temperature of about 90° to 105° C. is preferably used to prepare products having a density of about 0.94 to 0.97.

The fluid bed reactor is operated at pressures of up to about 1000 psi, and is preferably operated at a pressure of from about 150 to 350 psi, with operation at the higher pressures in such ranges favoring heat transfer since an increase in pressure increase the unit volume heat capacity of the gas.

The partially activated impregnated precursor composition is injected into the bed at a rate equal to its consumption at a point 30 which is above the distribution plate 20. A gas which is inert to the partially activated impregnated precursor composition such as nitrogen or argon is used to carry the composition into the bed. Injecting the partially activated precursor composition at a point above the distribution plate is an important feature of this invention. Since the catalysts formed from the impregnated precursor composition used in the practice of the invention are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach the ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during the start up and shut down. The reactor does not require the use of stirring means and/or wall scraping means.

The highly active supported catalyst system of this invention appears to yield a fluid bed product having and average particle size between about 0.02 to about 0.05 inches and preferably about 0.022 to about 0.040 inches wherein catalyst residue is unusually low. The polymer particles have a relatively round particle shape and a relatively low level of fines (<125 microns) i.e., ≦4 percent by weight.

The feed stream of gaseous monomer, with or without inert gaseous diluents, is fed into the reactor to achieve a space time yield of about 2 to 10 pounds/hour/cubic foot of bed volume.

The term virgin resin or polymer as used herein means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

Density: A plaque is made and conditioned for one hour at 120° C. to approach equilibrium crystallinity and is then quickly cooled to room temperature. Measurement for density is then made in a density gradient column.

Melt Index (MI): ASTM D-1238—Condition E—Measured at 190° C.—reported as grams per 10 minutes.

Flow Rate (HLMI): ASTM D-1238—Condition F—Measured at 10 times the weight used in the melt index test above.

Melt Flow Ratio (MFR)=Flow Rate/Melt Index.

Productivity: A sample of the resin product is ashed, and the weight percent of ash is determined; since the ash is essentially composed of the catalyst, the productivity is thus the pounds of polymer produced per pound of total catalyst consumed. The amount of Ti, Mg and Cl in the ash are determined by elemental analysis.

Bulk density: The resin is poured via $\frac{7}{8}''$ diameter funnel into a 100 ml graduated cylinder to 100 ml line without shaking the cylinder, and weighed by difference.

Average Particle Size: This is calculated from sieve analysis data measured according to ASTM-D-1921 Method A using a 500 g. sample. Calculations are based on weight fractions retained on the screens.

I. Preparation of Impregnated Precursor

In a 100 gallon glass lined autoclave equipped with a mechanical stirrer are placed 6.0 kg (62.83 mol) anhydrous $MgCl_2$ and 195 kg tetrahydrofuran (THF). To this mixture, 3.554 kg (18.73 mol) $TiCl_4$ is added over $\frac{1}{2}$ hour. The mixture is heated to 60° C. for about $\frac{1}{2}$ hour in order to completely dissolve the material. To this mixture is added 45 kg of porous silica, dehydrated at 800° C. which was treated with triethyl aluminum to give 8 wt % loading of triethyl aluminum. The mixture is stirred for $\frac{1}{4}$ hour. The excess solvent is decanted and the solids are dried on a Sparkler filter. The resulting sludge is dried in a rotary dryer under 15 mm vacuum with a slow $N_2$ purge at $\leq 65°$ C. for about 16 hours to provide a dry, free-flowing solid. The impregnated precursor composition has the formula:

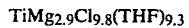

$TiMg_{2.9}Cl_{9.8}(THF)_{9.3}$

In this formula the calculated value of q is 6.4 which is significantly lower than the 9.3 value experimentally determined.

II. Activation Procedure

The desired weights of impregnated precursor composition and activator compound are added to a mixing tank with sufficient amounts of anhydrous aliphatic hydrocarbon diluent such as isopentane to provide a slurry system.

The activator compound and precursor compound are used in such amounts as to provide a partially activated precursor composition which has an Al/Ti ratio of >0 to ≦10:1.

The contents of the slurry system are then thoroughly mixed at room temperature and at atmospheric pressure for about $\frac{1}{4}$ to $\frac{1}{2}$ hour. The resulting slurry is then dried under a purge of dry inert gas such as nitrogen or argon, at atmospheric pressure and at a temperature of 65°±10° C. to remove the hydrocarbon diluent. The resulting catalyst is in the form of a partially activated precursor composition which is impregnated within the pores of the silica. The material is a free flowing particulate material having the size and shape of the silica. It is not pyrophoric unless the aluminum alkyl content exceeds a loading of 10 weight percent. It is stored under a dry inert gas such as nitrogen or argon prior to future use. It is now ready for use by being injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. These dilute solutions contain about 5 to 30% by volume of the activator compound.

The activator compound is added to the polymerization reactor so as to maintain the Al/Ti ratio in the reactor at a level of about ≧10 to 400:1 and preferably of 15 to 60:1.

EXAMPLES 1 TO 7

Ethylene was homopolymerized (Examples 1 to 3 and 5 to 7) and copolymerized with butene-1 (Example 4) in these series of examples.

In Examples 1 and 2 the catalyst used was formed as described above except that the partial activation procedure was not used but rather total activation of the precursor composition was accomplished in the polymerization reactor with triethyl aluminum in a five weight percent isopentane solution so as to provide the activated catalyst in the reactor with an Al/Ti mol ratio of 15-40.

In Examples 3 to 7, the impregnated precursor composition was partially activated (see activation procedure above) in a mix tank with the aluminum compound as shown in Tables I to III to provide an Al/Ti ratio as shown in Tables I to III. The completion of the activation of the precursor composition in the polymerization reactor was accomplished with triethyl aluminum in a five weight percent isopentane solution so as to provide the activated catalyst in the reactor with an Al/Ti mol ratio of 15-40.

Each of the polymerization reactions was continuously conducted for >1 hour after equilibrium was reached at 103°-105° C. and under a pressure of about 300 psig with $H_2/C_2$ mol ratio of 0.35-0.50 and a gas velocity of 3 to 4 times $G_{mf}$ in a fluid bed reactor system at a space time yield of about 3 to 6 lbs/hr/ft³ of bed space. The reaction system was as described in the drawing above. It has a lower section 10 feet high and 13½ inches in (inner) diameter, and an upper section which is 16 feet high and 23½ inches in (inner) diameter.

Tables I to III below lists the percent loading of the precursor composition, weight percent of triethyl aluminum used to treat the silica, q measured, q calculated (q calculated is q=1.5 m+2), aluminum compound used in the mix tank, Al/Ti mol ratio in the mix tank as well as the residual titanium, bulk density, density, average particle size and fines of the granular virgin resins made in these examples.

TABLE I

Effect of Excess (q is >1.5m + 2) Electron Donor (THF) on Activity of Impregnated Catalyst

| Example | 1 | 2 | 3 |
|---|---|---|---|
| Precursor Composition | | | |
| Percent loading of Precursor Composition | 20 | 20 | 20 |
| Silica Treated With Triethyl aluminum (wt percent) | 8 | 8 | 8 |
| q (measured) | 8.0 | 10.2 | 9.5 |
| q (calculated) | 8.0 | 7.4 | 7.5 |
| Activation of Precursor Composition in Mix Tank | | | |
| Aluminum Compound | — | — | Triethylaluminum |
| Al/Ti | — | — | 4 |
| Polymer Properties | | | |
| Residual Titanium (ppm) | 9 | 60 | 9 |
| Density (g/cc) | 0.970 | 0.969 | 0.966 |
| Bulk density (lbs/ft$^3$) | 28 | 32 | 27.5 |
| Particle size (in) | 0.03 | 0.019 | 0.04 |
| Fines (percent, <125 microns) | 1.6 | 1.2 | 0.2 |

The data in Table I show that when q is >1.5 m+2 and there is no partial activation in the mix tank (Example 2), catalyst productivity is very low (Ti=60). When q is >1.5 m+2 and there is partial activation in the mix tank (Example 3), as in the present invention, catalyst productivity is high (Ti=9).

TABLE II

Effect of Variables in the Catalyst Preparation on Catalytic Activity

| Example | 3 | 4 | 5 |
|---|---|---|---|
| Precursor Composition | | | |
| Percent Loading of Precursor Composition | 20 | 20 | 28 |
| Silica Treated With Triethyl Aluminum (wt. percent) | 8 | 4 | 4 |
| q (measured) | 9.5 | 9.5 | 9.3 |
| q (calculated) | 7.5 | 6.5 | 6.3 |
| Activation of Precursor Composition in Mix Tank | | | |
| Aluminum Compound | Triethyl aluminum | Triethyl aluminum | Triethyl aluminum |
| Al/Ti | 4 | 4.5 | 2 |
| Polymer Properties | | | |
| Residual Titanium (ppm) | 9 | 4 | 12 |
| Density (g/cc) | 0.966 | 0.955 | 0.967 |
| Bulk Density (lbs/ft$^3$) | 27.5 | 27.8 | 25 |
| Particle size (in) | 0.04 | 0.023 | 0.033 |
| Fines (percent <125 microns) | 0.2 | 0.5 | 0.4 |

The data of Table II show that by varying the percent loading of the precursor composition, the weight percent of silica treated with triethyl aluminum, q (measured) and Al/Ti ratio, catalysts are produced which exhibit high activity and polymers are prepared which exhibit high bulk density and a low level of fines.

TABLE III

Effect of Aluminum Activating Agents on Activity of Impregnated Catalyst

| Example | 3 | 6 | 7 |
|---|---|---|---|
| Precursor Composition | | | |
| Percent Loading of Precursor Composition (wt percent) | 20 | 20 | 20 |
| Silica Treated with Triethyl Aluminum (wt. percent) | 8 | 4 | 4 |
| q (measured) | 9.5 | 7.6 | 7.6 |
| q (calculated) | 7.5 | 6.2 | 6.2 |
| Partial Activation of Precursor Composition in Mix Tank | | | |
| Aluminum Compound | Et$_3$Al[1] | Et$_2$AlOEt[2] | Al(C$_6$H$_{13}$)$_3$ |
| Al/Ti | 4 | 6 | 3 |
| Polymer Properties | | | |
| Residual Titanium (ppm) | 9 | 14 | 14 |
| Density (g/cc) | 0.966 | 0.966 | 0.967 |
| Bulk density (lbs/ft$^3$) | 27.5 | 27.4 | 28 |
| Particle size (in) | 0.04 | 0.021 | 0.026 |
| Fines (percent <125 microns) | 0.2 | 0.8 | 0.4 |

[1] Et$_3$Al = triethyl aluminum
[2] Et$_2$AlOEt = diethylaluminum ethoxide

The data of Table III show that by varying the aluminum compound used to partially activate the precursor composition in the mix tank high activity catalysts based on these aluminum reagents can be prepared and polymers are formed which exhibit high bulk density and a low level of fines.

What is claimed is:

1. A continuous catalytic process for producing ethylene homopolymers or copolymers containing ≧97 mol percent of ethylene and ≦3 mol percent of one or more C$_3$ to C$_8$ alpha olefins with a Ti containing catalyst at a productivity of ≧50,000 pounds of polymer per pound of Ti under a pressure of <1000 psi in a gas phase fluid bed reaction said polymer being produced in granular form and having a density of about ≧0.94 to ≦0.97 and a melt flow ratio of about ≧22 or ≦32 which comprises polymerizing ethylene, or copolymerizing ethylene with at least one C$_3$ to C$_8$ alpha olefin, at a temperature of about 30° to 115° C. by contacting the monomer charge in the gas phase reaction zone, with particles of a non-comminuted catalyst system, comprising a precursor composition impregnated in an inert porous support and when so impregnated having the formula $Mg_mTi_1(OR)_nX_p[ED]_q$

wherein R is a C$_1$ to C$_{14}$ aliphatic or aromatic hydrocarbon radical, or COR' wherein R' is a C$_1$ to C$_{14}$ aliphatic or aromatic hydrocarbon radical, X is selected from the group consisting of Cl, Br, I, or mixtures thereof, ED is an electron donor compound, m is ≧0.5 to ≦56, n is 0, 1 or 2, p is ≧2 to ≦116 and q is >1.5 m+2

ED is a liquid organic electron donor compound in which said precursor composition and the Ti and Mg component thereof are soluble and which is selected from the group consisting of alkyl esters of aliphatic and aromatic carboxylic acids, aliphatic ethers, cyclic ethers and aliphatic ketones, said impregnated precursor composition being partially activated with >0 to ≦10 mols of activator compound per mol of Ti in said impregnated precursor composition, and completing the activation of the partially activated precursor composition in said reaction zone with >10 to ≦400 mols of activator compound per mol of Ti in said precursor composition, said activator compound having the formula $$Al(R'')_c X'_d H_e$$

wherein X' is Cl or OR''', R'' and R''' are the same or different, and are $C_1$ to $C_{14}$ saturated hydrocarbon radicals, d is 0 to 1.5, e is 1 or 0 and c+d+e=3.

2. A process as in claim 1 in which ethylene homopolymer is produced.

3. A process as in claim 2 in which said magnesium component comprises $MgCl_2$.

4. A process as in claim 2 in which said electron donor compound comprises at least one ether.

5. A process as in claim 4 in which said electron donor compound comprises tetrahydrofuran.

6. A process as in claim 2 in which said titanium component comprises $TiCl_4$.

7. A process as in claim 2 wherein the inert porous support comprises silica.

8. A process as in claim 7 wherein the silica is treated with at least one activator compound of the formula $$AlR_3$$

wherein the R's are the same or different, and are $C_1$ to $C_{14}$ saturated hydrocarbon radicals.

9. A process as in claim 1 which is conducted under a mass gas flow rate of about 1.5 to 10 times $G_{mf}$.

* * * * *